G. F. EDGINGTON.
LUBRICATOR.
APPLICATION FILED AUG. 14, 1912.
1,064,717.
Patented June 17, 1913.
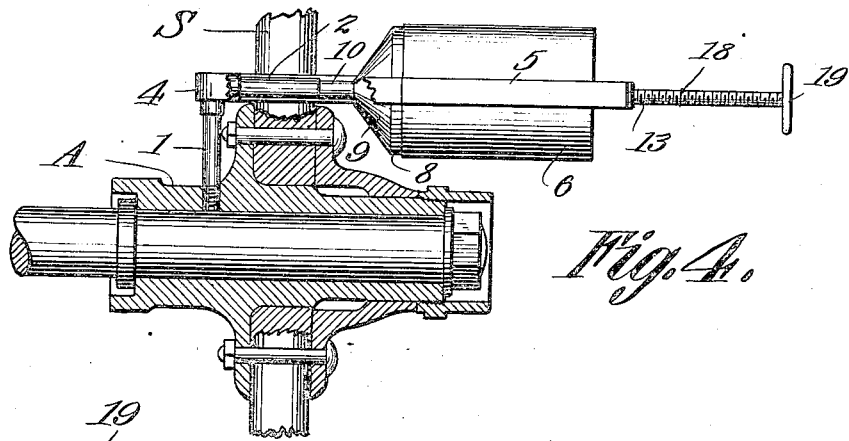
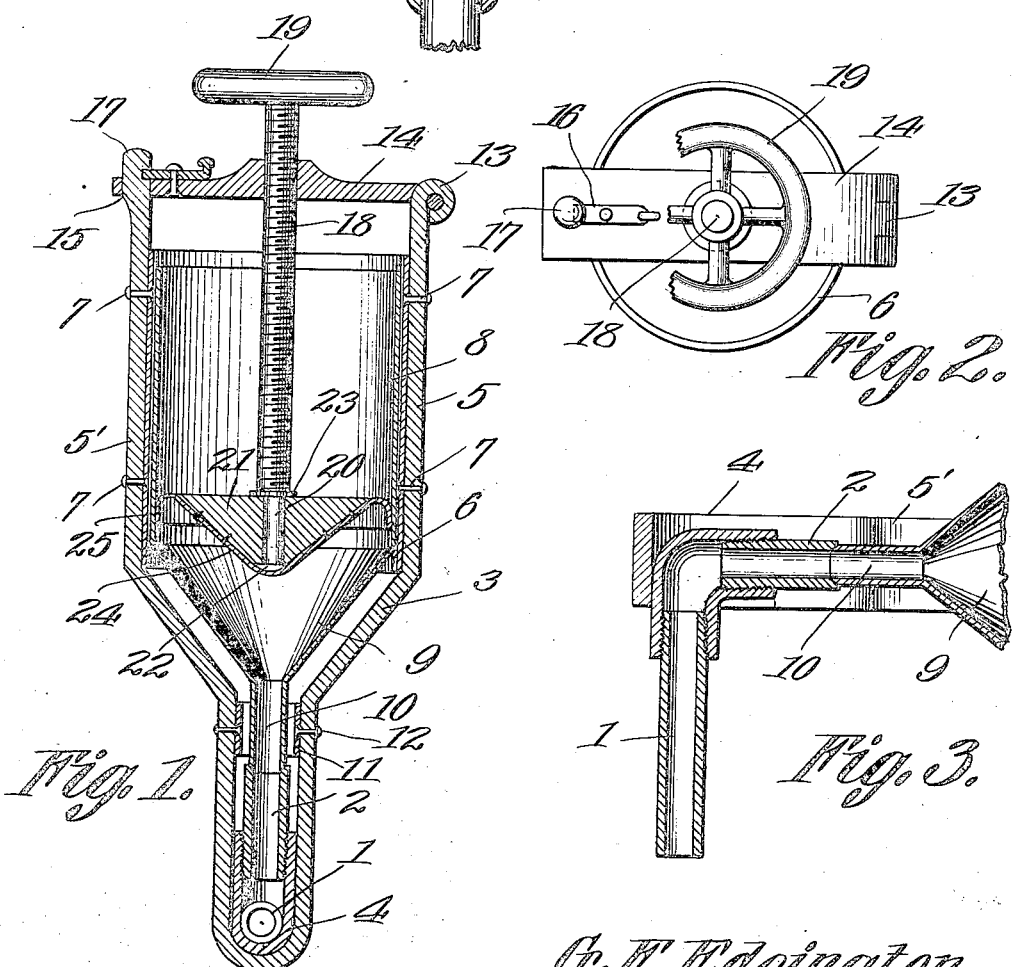

UNITED STATES PATENT OFFICE.

GEORGE F. EDGINGTON, OF JEFFERSONVILLE, INDIANA.

LUBRICATOR.

1,064,717.  Specification of Letters Patent.  Patented June 17, 1913.

Application filed August 14, 1912. Serial No. 715,100.

*To all whom it may concern:*

Be it known that I, GEORGE F. EDGINGTON, a citizen of the United States, residing at Jeffersonville, in the county of Clark and State of Indiana, have invented a new and useful Lubricator, of which the following is a specification.

The present invention relates to improvements in lubricators, the primary object of the invention being the provision of a lubricator especially adapted for use in supplying a heavy lubricant or grease to hubs of vehicles, the lubricant containing receptacle being slidably mounted within a frame and said frame being provided with means for engaging a nipple carried by the hub and through which the lubricant is to be directed, a screw actuated plunger being mounted in the moveble container and actuated to supply the lubricant and retain the container closely to the nipple simultaneously.

With the foregoing and other objects in view which will appear as the description proceeds, the invention resides in the combination and arrangement of parts and in the details of construction hereinafter described and claimed it being understood that changes in the precise embodiment of the invention herein disclosed can be made without departing from the spirit of the invention.

In the drawings Figure 1 is a longitudinal sectional view through the complete lubricator and hub nipple. Fig. 2 is a top plan view thereof. Fig. 3 is a vertical longitudinal sectional view through the hub nipple and the adjacent portion of the lubricator and container. Fig. 4 is a longitudinal sectional view through a vehicle hub and axle with the lubricator in operative relation thereto.

Referring to the drawings, the numeral 1 designates a pipe which is connected to supply lubricant to the axle A and has its upper terminal or nipple 2 disposed to project between the spokes S of the wheel, the outer end of the same being sealed by any form of cap.

The supporting frame for the lubricator is provided with a V-shaped portion having the reduced spaced terminals 4 which are adapted to fit astride of the nipple, as clearly shown in Fig. 4, and the diverging arms 3, which terminate in the parallel and spaced arms 5 and 5′ which provide a supporting means for the stationary open ended metallic cylinder 6 which is connected to the arms 5 and 5′ by means of the rivets 7.

Mounted removably and slidably within the stationary cylinder 6 is the cylindrical portion of the lubricant container 8 which is provided with the funnel-shaped end 9 terminating in the lubricant directing or eduction spout 10. This spout 10 is mounted so as to be placed in engagement with the extreme outer end of the nipple 2 and concentrically of the sleeve 11 which is connected within the frame by means of the rivets 12.

By means of the hinge member 13, the bridging plate 14 is connected to the terminal of the arm 5, the same being provided with an aperture 15 adapted to fit over the stud or coacting latch member 17 formed upon the extreme end of arm 5′, a pivoted latch 16 being carried by the bridging member 14 to lock the same in the position as shown in Fig. 1.

The threaded stem 18 is threaded through the bridging plate 14 and is provided with the operating handle 19, while upon its reduced end 20 is rotatably mounted the conical disk 21, the head 22 and the washer 23 providing a means for retaining the disk 21 relatively to the screw 18. Secured to the conical face of the disk 21 is a flexible covering 24 whose peripheral rim 25 engages the inner wall of the container 8 to provide a plunger for feeding the lubricant within the container through the spout or nozzle 10. By this means it will be seen that the rotation of the screw 18 to feed the lubricant through the nozzle 10 will also tend, after the nozzle 10 has been placed in close engagement with the nipple 2, to move the whole container 8 so as to retain the nozzle 10 into close engagement with the nipple 2, the rotation of the stem 18 in the opposite direction retracting the plunger 21 and at the same time also moving the container 8 in the same direction and removing the nozzle 10 from engagement with the nipple 2. By this means the greater the pressure exerted upon the stem 18 and plunger 21, the greater pressure will be exerted to hold the container in close engagement with the nipple 2, thus permitting the better supplying of a heavy grease through the pipe 1 to the axle. In fact the pressure may be such as to force the older lubricant within the hub and around the axle out of the respective ends thereof.

When it is desired to refill the container 8, the screw 18 is rotated to remove the plunger 21 exteriorly of the container 8, at which time the latch 16 is manipulated to permit the bridging plate 14 to be swung outwardly and carry with it the plunger 21. The container 8 may now be removed from the cylindrical carrier 6 to be filled, after which the same is replaced and the bridging plate 14 is again fastened in place by means of the latch 16.

What is claimed is:

A lubricator, including a supporting frame, having a Y-shaped nipple engaging portion terminating in two parallel and spaced arms, one of said arms being provided with a hinging member, and the opposite arm being provided with a latch member, an open ended cylinder disposed between the parallel arms and terminating at a point adjacent the junction of the Y-shaped portion with the parallel arms of the frame, the opposite end of the cylinder terminating at a point within the terminals of the parallel arms, a lubricant container having a cylindrical body portion open at one end and carrying a funnel shaped eduction portion at the opposite end, the cylindrical portion being slidably mounted within and of lesser length than the first mentioned cylinder, the outlet end of the funnel portion being projected between the reduced portion of the Y-shaped portion of the frame, a bridging plate having a hinging member coacting with the hinging member of one of the parallel arms of the frame, the opposite end being apertured to receive the opposite parallel arm, a coöperating latching member carried by the free end of the bridging member for engaging the latch member of the arm, the central portion of the bridging member being provided with a threaded aperture therethrough, a handle actuated screw mounted in said aperture for movement therethrough, the lower end of said screw being reduced, and a cone-shaped plunger rotatably mounted upon the lower end of the screw and carried by the screw, said plunger being disposed for movement into and out of the cylindrical body portion of the lubricant container.

In testimony that I claim the foregoing as my own, I have hereto affixed my signature in the presence of two witnesses.

GEORGE F. EDGINGTON.

Witnesses:
R. A. RODGERS,
HUGH EDGINGTON.